United States Patent [19]
Mueller

[11] Patent Number: 5,508,735
[45] Date of Patent: Apr. 16, 1996

[54] UNDERDECK INSPECTION DEVICE

[75] Inventor: Richard A. Mueller, Olmsted Falls, Ohio

[73] Assignee: Northeast Technical Service Co. Inc., Columbia Station, Ohio

[21] Appl. No.: 273,643

[22] Filed: Jul. 12, 1994

[51] Int. Cl.⁶ ........................................... H04N 7/18
[52] U.S. Cl. ..................................... 348/82; 348/211
[58] Field of Search .......................... 348/83, 81, 82, 348/84, 85, 211, 373, 376

[56] References Cited

U.S. PATENT DOCUMENTS

| | | |
|---|---|---|
| 3,764,736 | 10/1973 | Kosky et al. . |
| 3,930,942 | 1/1976 | Thome . |
| 4,169,758 | 10/1979 | Blackstone et al. . |
| 4,190,857 | 2/1980 | Creek et al. . |
| 4,302,772 | 11/1981 | Gillot . |
| 4,331,975 | 5/1982 | Krawza et al. . |
| 4,526,311 | 7/1985 | Schröder ................................ 348/83 |
| 4,532,545 | 7/1985 | Hanson . |
| 4,586,079 | 4/1986 | Cooper, Jr. et al. . |
| 4,789,947 | 12/1988 | Maciejczak . |
| 5,068,721 | 11/1991 | Dietrich ................................ 348/83 |
| 5,140,319 | 8/1992 | Riordan . |
| 5,241,380 | 9/1993 | Benson et al. ....................... 348/82 |

Primary Examiner—Tommy P. Chin
Assistant Examiner—A. Au
Attorney, Agent, or Firm—Pearne, Gordon, McCoy & Granger

[57] ABSTRACT

An apparatus and method for the remote visualization and inspection of an internal storage space, such as a ship's hold. The apparatus includes a mounting stand to which is rotationally mounted a support shaft, the support shaft having a camera and a light source secured thereto. The camera and light source rotate with the support shaft, and are pivotally movable relative to the support shaft. A drive shaft extends through the support shaft and is operable to simultaneously pivot the light source and camera. A light adjustment drive shaft is mounted to the hollow support shaft and allows the operator to pivot the light source independently of the camera to permit a wider field of view than would otherwise be available. The apparatus is inserted, via an access opening, into a storage space and thereafter operated to allow an inspector, located outside of the storage space, to visually inspect the surfaces surrounding and defining the storage space.

19 Claims, 6 Drawing Sheets

UNDERDECK INSPECTION DEVICE

BACKGROUND OF THE INVENTION

1. Field of the Invention

The present invention relates to ship inspecting devices and, more particularly, to devices for inspecting interior surfaces surrounding and defining a ship's hold.

2. Description of the Related Art

Ships having holds to receive liquid, such as oil, or bulk material, such as grain or sand, must be periodically inspected to insure that the welds joining the sheet metal of the hold to the supporting steel beams have not deteriorated due to the stresses encountered during transport.

Several methods are presently employed to inspect the bottom wall, vertical side walls, transverse webs, and the underdeck surface that define the ship's hold. One method presently employed to inspect the bottom wall, side walls and transverse webs requires the inspector to walk within the empty hold to inspect the bottom wall and a lower portion of the side walls, transverse webs, and the welds associated therewith. Thereafter, the hold is incrementally flooded to allow the inspector, then located in a small boat, to float within the hold and inspect the welds on the side walls and transverse webs which are vertically remote from the bottom wall. At the end of the flooding process, the inspector is close to the underdeck surface and can inspect the welds thereon, as well as the welds joining the underdeck to the side walls or transverse webs. This type of inspection process is undesirable as it is very time consuming to incrementally flood each hold for individual inspection of thereof, and increases the inspection time and, hence, the period for which the ship is unavailable for use.

Another method of inspecting the underdeck surface requires the inspector to manually hang and swing from beams provided by the underdeck and to view the underdeck welds while so suspended. It is obvious that such an inspection procedure is quite dangerous and has, in fact, resulted in several deaths. As such, this method of underdeck inspection is generally considered undesirable.

The inaccessibility of the underdeck surface has resulted in it generally going uninspected, which is not desirable from a safety standpoint since any degradation of the ship's strength resulting from breaks or discontinuities in the underdeck welds go undetected, and therefore increases the chance and extent of structural damage to the ship when under great stress, such as during a storm or when the ship has run aground.

Therefore, there exists a need in the art for a method and an apparatus for inspecting the underdeck of a ship and for inspecting the union of the underdeck with the vertical side walls and transverse webs.

SUMMARY OF THE INVENTION

The present invention provides an apparatus and a method for inspecting an interior storage space which allows an inspector to remotely visualize and inspect the surfaces surrounding the storage space. More particularly, the present invention provides an apparatus and method for the remote visualization and inspection of a ship's underdeck surface.

According the present invention, the apparatus includes an elongated hollow support shaft mounted to and extending downwardly from a mounting stand. The support shaft has a longitudinal axis about which the shaft is mounted for rotation. A light source and a camera are secured to the hollow support shaft and rotate therewith.

In further accordance with the present invention, a drive shaft extends through the hollow support shaft and is rotatable relative to the hollow support shaft. The drive shaft is operably attached to the camera and light source.

In further accordance with the present invention, rotation of the drive shaft causes the camera and light source to simultaneously pivot. Rotation of the hollow support shaft causes the camera and light source to rotate about the longitudinal axis, thereby permitting inspection of the interior storage space.

The apparatus includes means for remotely controlling the camera and the light source and means for pivoting the light source independently of the camera to allow a wider field of view than would be otherwise available.

In further accordance with the present invention, means are provided to move the light source independently of the camera.

BRIEF DESCRIPTION OF THE DRAWINGS

These and further features of the present invention will be apparent with reference to the following description and drawings, wherein.

DETAILED DESCRIPTION OF THE PREFERRED EMBODIMENT

Figure 1:
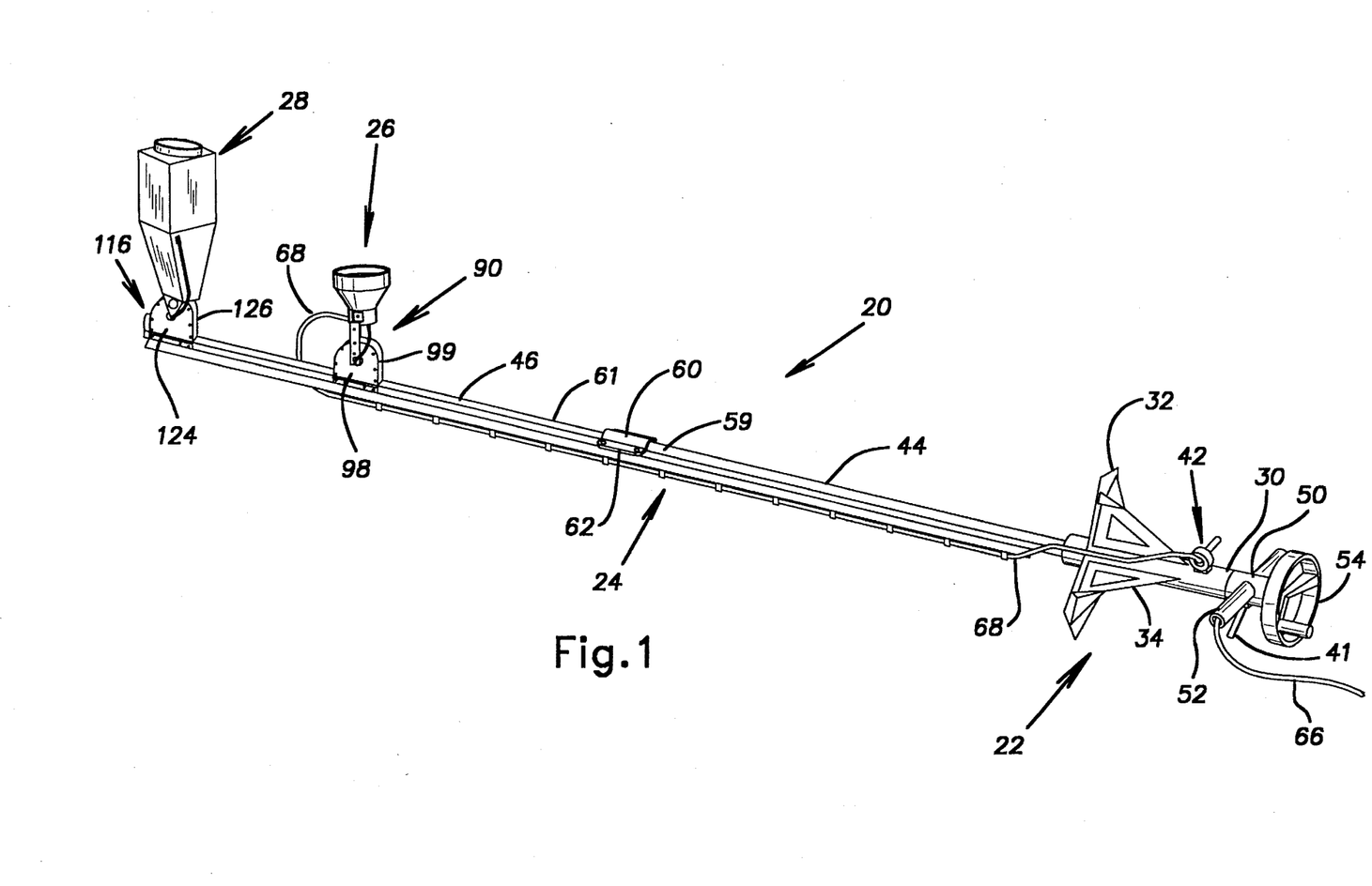
FIG. 1 is a perspective view of an inspection apparatus according to the present invention.

With reference to FIG. 1, the inspection apparatus 20 of the present invention generally provides a mounting stand 22, an elongated hollow support shaft 24, a light source 26, and a camera 28.

Figures 2, 3:
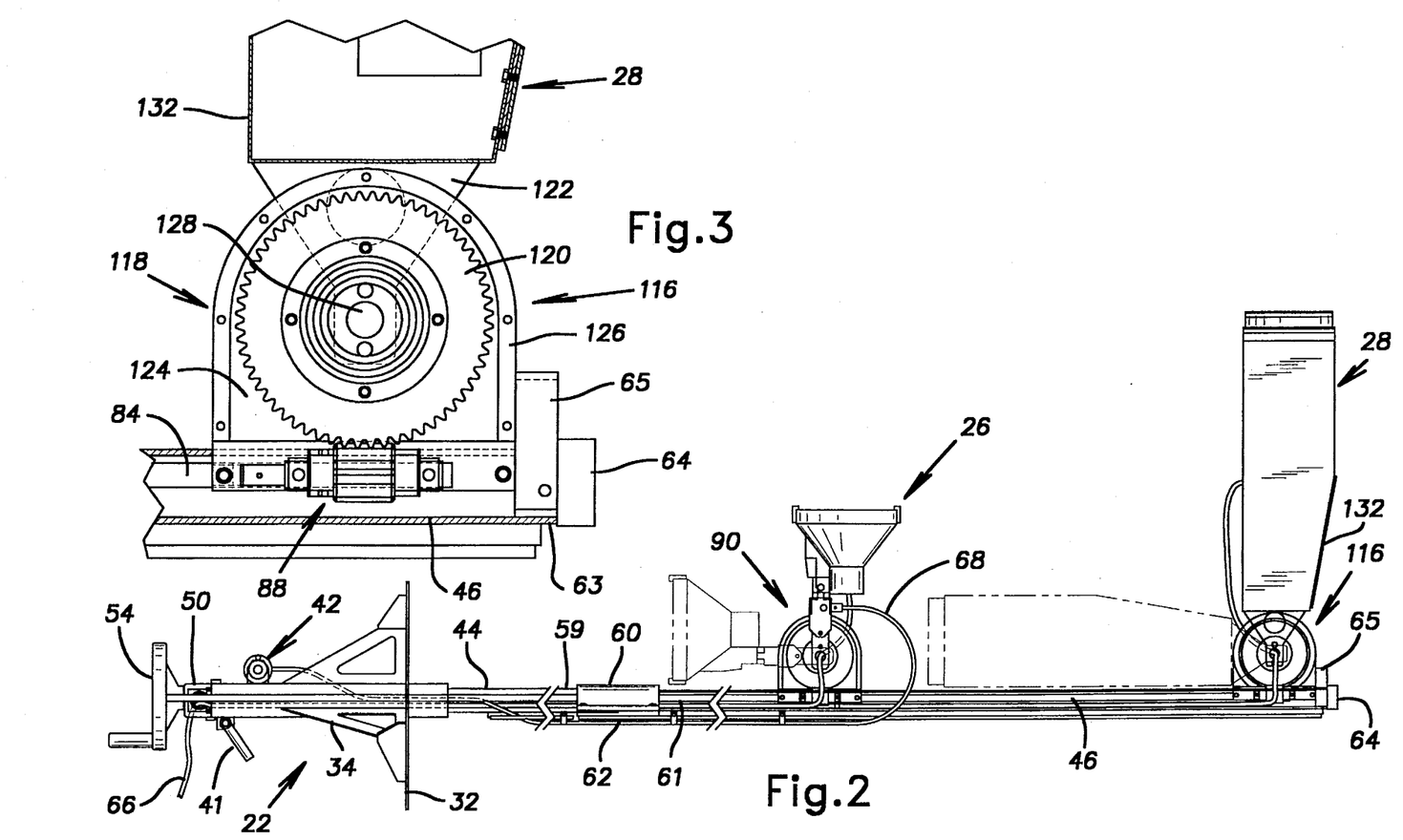
FIG. 2 is an elevational view, partly in cross section, of the inspection apparatus shown in FIG. 1, with a storage and insertion position of a light source and camera shown in phantom.
FIG. 3 is an enlarged elevational view, partly in cross section, of a camera and camera support assembly according to the present invention.
Figure 6:
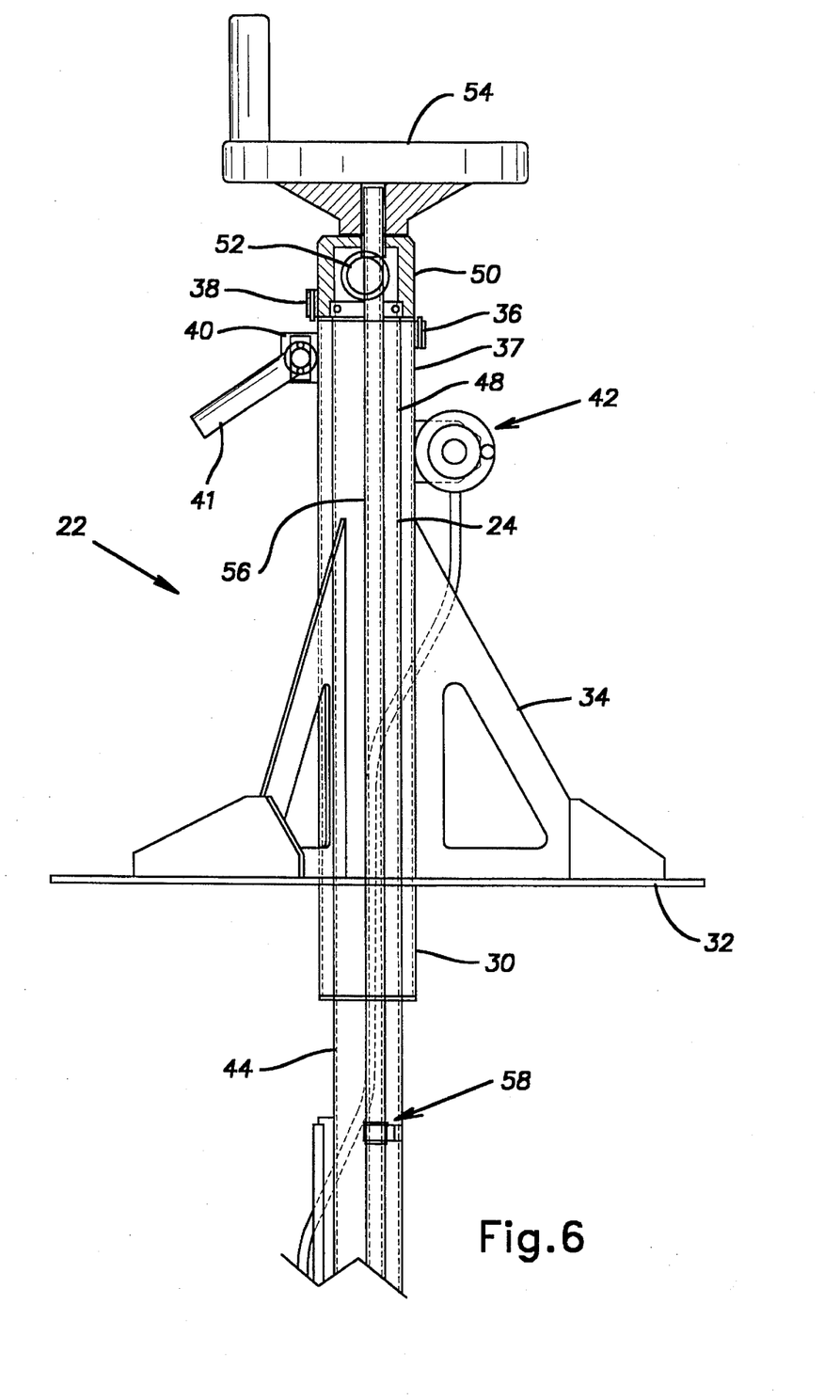
FIG. 6 is an enlarged elevational view, partly in cross section, of a mounting stand and support shaft according to the present invention.

As shown best in FIGS. 1, 2, and 6, the mounting stand 22 has a generally hollow central tube 30 and a series of legs 32 which extend outwardly from the tube. Each of the legs 32 have openings formed therein to allow the mounting stand 22 to be removably attached, by conventional fasteners, to the deck of a ship, as will be described more fully hereafter. Strengthening ribs 34 extend from the legs 32 to the hollow central tube 30, and serve to stiffen the tube and limit deformation thereof.

A first stop member 36 projects from an upper end 37 of the hollow central tube 30 and cooperates with a second stop member 38 associated with the hollow support shaft 24 to prevent over-rotation of the hollow support shaft 24 relative to the mounting stand 22. The upper end 37 of the central tube 30 includes a split flange having aligned outwardly extending wings 40 which receive a threaded clamping handle 41 to allow the upper end 37 of the tube to clamp 30 on the hollow support shaft 24. Clamping the hollow tube to the hollow support shaft prevents relative movement between the support shaft and tube, as is desirable during transport of the apparatus. The central tube 30 has a small light adjustment hand wheel 42 mounted thereto which is operated by the user to move the light source 26 independently of the camera 28, as will be described more fully hereafter.

The hollow support shaft 24 is formed in two sections, having an upper section 44 which extends through the mounting stand 22 and a lower section 46 to which is mounted the light source 26 and camera 28. The upper section 44 preferably has a circular cross section to allow it to rotate within the central tube 30 of the mounting stand 22, while the lower section 46 preferably has a square cross section to facilitate attachment of the camera 28 and light source 26 thereto.

As shown best in FIG. 6, the upper section 44 of the hollow support shaft 24 has an upper terminal end 48 which projects from the mounting stand and has an enlarged cap 50 fixedly mounted thereto. The cap 50 is positioned or slid over the upper terminal end 48 and immovably retained thereon by a series of screws. The enlarged cap 50 abuts the upper end 37 of the hollow central tube 30 and prevents or limits downward movement of the hollow support shaft 24 relative to the mounting stand 22. As discussed hereinbefore, the second stop member 38 projects downwardly from the enlarged cap 50 and is operable to engage the first stop member 36 provided by the hollow tube 30 to prevent over-rotation of the hollow support shaft 24 relative to the mounting stand 22.

A pair of opposed handles 52 extend outwardly from the cap 50 and allow the operator or inspector to rotate the hollow support shaft 24 relative to the central tube 30 of the mounting stand. A hand wheel 54, which is connected to a flexible main drive shaft 56, is mounted for rotation on the enlarged cap 50 and allows the operator or inspector to rotate the main drive shaft 56 relative to the hollow support shaft 24. Preferably, a series of mounting blocks and bearings 58 mount the main drive shaft 56 for rotation within the hollow support shaft sections 44, 46.

Figures 4, 5:
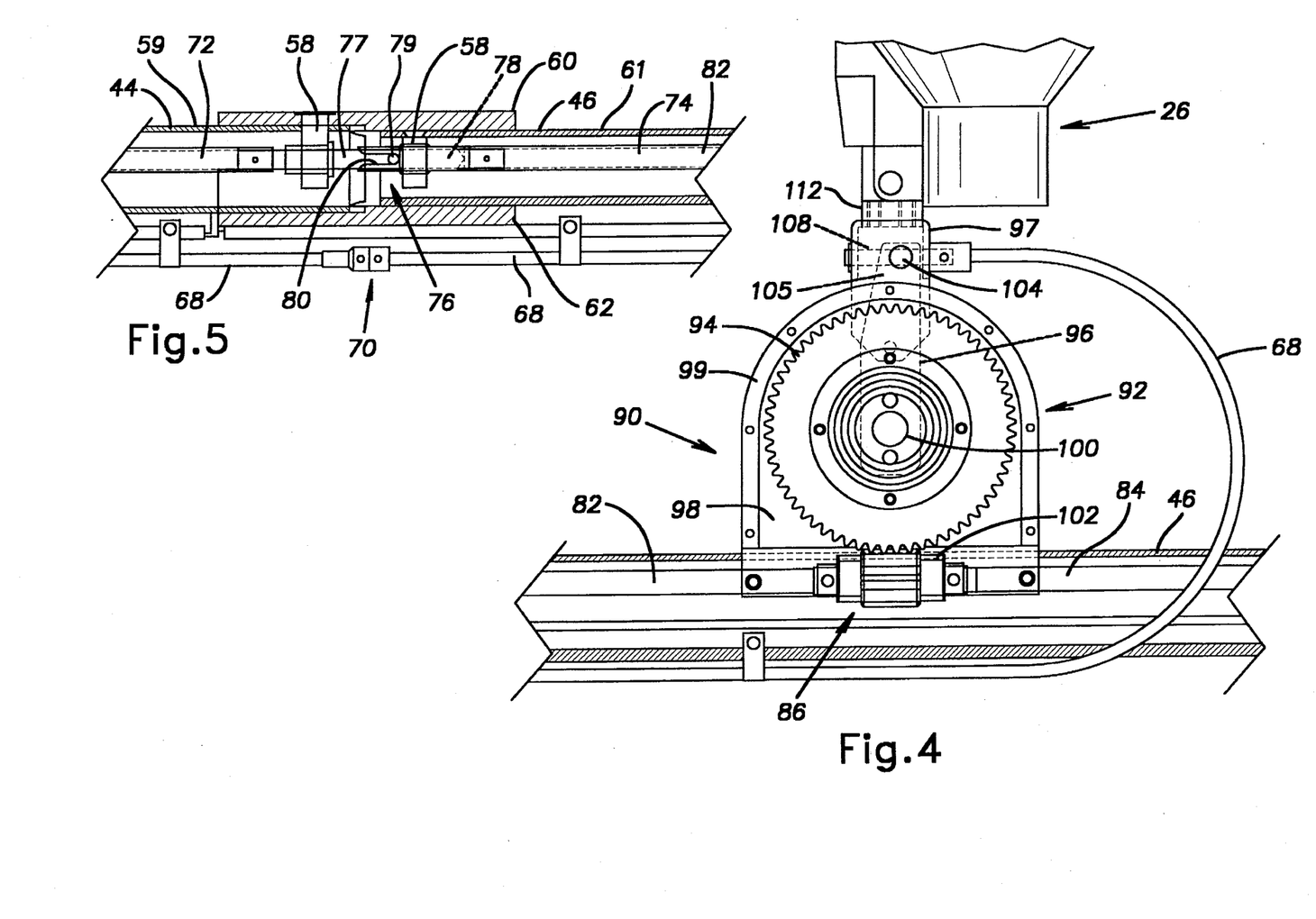
FIG. 4 is an enlarged elevational view, partly in cross section, of a light source and light source support assembly according to the present invention.
FIG. 5 is an enlarged elevational view, in cross section, of a union of an upper and lower support shaft sections according to the present invention.

With specific reference to FIG. 5, a lower end 59 of the upper section 44 of the hollow support shaft 24 has a first clamp member 60 permanently attached thereto by welding, fasteners, or the like. An upper end 61 of the lower section 46 of the hollow support shaft 24 has a second clamp member 62 permanently attached thereto by welding, fasteners, or the like. Preferably, the first clamp member 60 has a body portion extending axially from the support shaft upper section 44 which has a downwardly opening channel adapted to receive the upper end 61 of the support shaft lower section 46 and a pair of lateral flanges which extend outwardly from the body section. Similarly, the second clamp member 62 has a body portion extending axially from the support shaft lower section 46 which has an upwardly opening channel adapted to receive the lower end 59 of the support shaft upper section 44 and a pair of lateral flanges which extend outwardly from the body section.

The sections 44, 46 of the hollow support shaft 24 are joined together by simultaneously sliding the lower end 59 of the upper section 44 into the channel provided by the second clamp member 62 and sliding the upper end 61 of the lower section 46 into the channel provided by the first clamp member 60. As such, the first and second clamp members 60, 62 are on relatively opposite sides of the upper and lower support shaft sections 44, 46, and the sections are trapped or received between the clamping members. Thereafter, the lateral flanges of the first and second clamp members 60, 62 are bolted together to secure the upper and lower hollow support shaft sections 44, 46 together.

A lower end 63 of the lower section 46 of the support shaft 24 has an end cap 64 secured thereto which closes the lower section 46 to prevent water and other undesirable material from entering the support shaft during use thereof (FIGS. 2 and 3). Adjacent the end cap 64 is mounted a stop block 65 which is engaged by the camera 28 when the camera is fully deployed in a downward direction. The stop block 65 prevents over-pivoting of the camera 28 and the light source 26, as will be discussed more fully hereafter.

Both sections of the hollow support shaft provide a central passage through which the main drive shaft 56 and various electrical cables 66 extend. The electrical cables 66, which extend through one of the handles 52 provided by the enlarged cap 50 and through the upper and lower support shaft sections 44, 46, supply power and operating control signals to the light source 26 and the camera 28.

A sheathed light adjustment drive shaft 68 is secured to the exterior of the hollow support shaft sections 44, 46 and extends between the light adjustment hand wheel 42 and the light source 26. The light adjustment drive shaft 68 is preferably formed in two pieces which are coupled together near the union of the upper and lower support shaft sections 44, 46 by a conventional connector 70 (FIG. 5).

The main drive shaft 56 is formed in two pieces, having an upper drive shaft 72, which is connected to the hand wheel 54 and extends through the upper section 46 of the hollow support shaft 24, and a lower drive shaft 74, which extends through the lower section 46 of the hollow support shaft 24 and is operably connected to the light source 26 and camera 28.

As shown best in FIG. 5, a two-piece connector 76 couples the upper and lower drive shafts 72, 74 for mutual rotation. A first connector piece 77, which is mounted on an end of the upper drive shaft 72 adjacent the lower drive shaft 74, includes a cylindrical wall having a transverse pin 79 extending from opposed sides thereof. A second connector piece 78, which is mounted on an end of the lower drive shaft 74 adjacent the upper drive shaft 72, includes a cylindrical sidewall having notches 80 formed in opposed sides thereof. The first and second connector pieces 77, 78 are easily joined together by slipping the transverse pin 79 of the first connector piece 77 into the notches 80 formed in the second connector piece 78, thereby allowing the upper and lower drive shafts 72, 74 to rotate simultaneously while permitting the drive shafts to be disconnected by moving the upper and lower drive shafts 72, 74 away from one another in a lengthwise direction, as will be described more fully hereafter during discussion of the assembly and disassembly of the apparatus 20.

The lower drive shaft 74 includes first and second lower drive shaft sections 82, 84. The first lower drive shaft section 82 has the second connector piece 78 attached to one end and a light source worm gear 86 attached to its opposite end (FIG. 4). The light source worm gear 86 is supported for rotation within the support shaft lower section 44 by bearings.

The second lower drive shaft section 84 is attached, at one end, to the light source worm gear 86 and, at the other end, to a camera worm gear 88 (FIG. 3). The camera worm gear 88 is supported for rotation within the support shaft lower section 44 by bearings.

Rotation of the hand wheel 54 causes the upper and lower drive shafts 72, 74 to rotate within the hollow support shaft 24 and, in turn, rotates the light source and camera worm gears 86, 88. Rotation of the worm gears 86, 88 causes the light source 26 and camera 28 to simultaneously and synchronously pivot, as will be apparent from the discussion to follow.

The light source 26 is pivotally mounted to the support shaft lower section 46 by a light source support assembly 90 which includes a light source gear case 92, a light source pinion gear 94, a pair of light mounting brackets 96, and a connecting bracket 97 (FIG. 4). The gear case 92 includes a pair of side panels 98 which are attached to opposite sides of the support shaft lower section 46, and a spacer panel 99 radially spaced from the light source pinion gear 94 and positioned between the side panels 98, as is shown best in FIG. 1.

The light source pinion gear 94 is mounted for rotation upon a first pinion gear shaft 100. A portion of the light source worm gear 86 extends through a first opening 102 formed in the lower section 46 of the hollow support shaft 24 beneath the light source pinion gear 94 to allow the light source worm and pinion gears 86, 94 to meshingly engage. Opposite ends of the first pinion gear shaft 100 are supported for rotation by bearings and extend through the side panels 98 of the light source gear case 92. Electrical cables for supplying power and control signals to the light source 26 extend through the first opening 102, into and through the pinion gear case 92, and are attached to the light source, as shown in FIGS. 1 and 2.

Each end of the first pinion gear shaft 100 has one of the light mounting brackets 96 attached thereto, as shown best in FIG. 4. The light mounting brackets 96 rotate with the light source pinion gear 94 and shaft 100, and extend perpendicular to the first pinion gear shaft 100 and away from the light source gear case 94.

Figure 9:
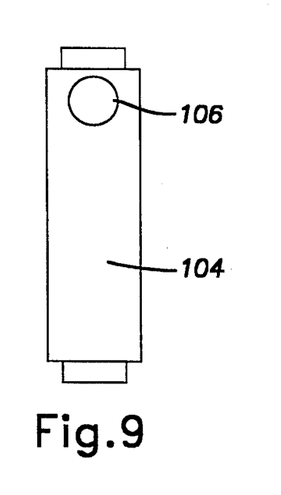
FIG. 9 is an elevational view of a fixed nut according to the present invention.
Figure 10:
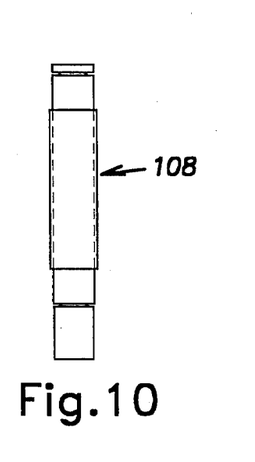
FIG. 10 is an elevational view of a threaded adjustment shaft according to the present invention; and, FIG. 11 is an elevational view of a light mounting bracket according to the present invention.
Figure 11:
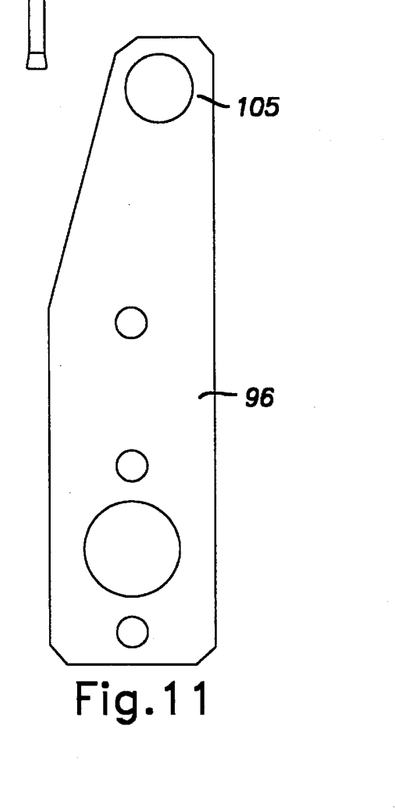

A fixed nut 104 (FIG. 9) is received between upper ends 105 of the light mounting brackets 96. The fixed nut 104 provides a hole 106 which threadingly receives a threaded adjustment shaft 108 and cooperates with the threaded adjustment shaft 108 (FIG. 10) to move the light source 26 independently of the camera 28, as will be described more fully hereafter.

Figure 8A:
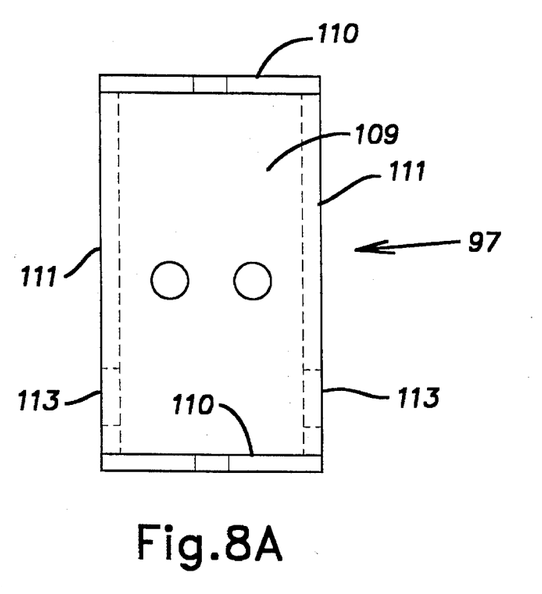
FIG. 8A is a top plan view of a connecting bracket according to the present invention.
Figure 8B:
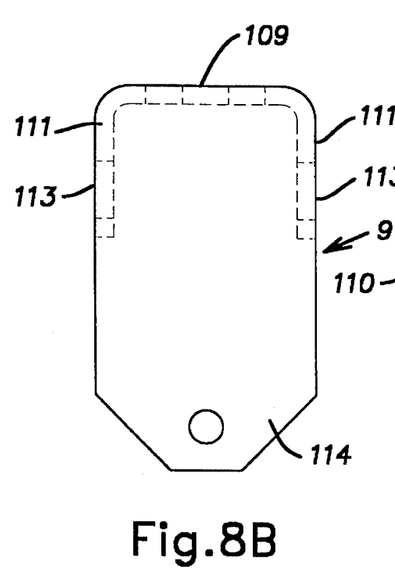
FIG. 8B is a side elevational view of the connecting bracket according to the present invention.
Figure 8C:
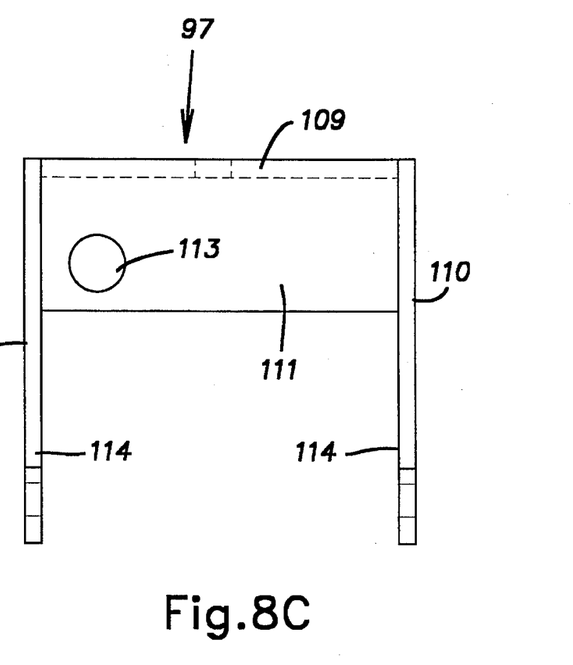
FIG. 8C is a front elevational view of the connecting bracket according to the present invention.

As shown best in FIGS. 8A–8C, The connecting bracket 97 has a body portion 109, a pair of legs 110 which extend downwardly from the body portion 109, and a pair of side plates 111 which are attached to the body portion 109 and extend between the legs 110. The body portion 109 is attached, via a mounting block 112, to the light source 26 (FIG. 4). The light mounting bracket upper ends 105 and the fixed nut 104 are received beneath the body portion 109 and between the legs 110 of the connecting bracket 97. A lower end 114 of each of the connecting bracket legs 110 are pivotally attached to the light mounting brackets 96. Each of the side plates 111 have axially-aligned holes 113 formed therein in which are received bearings for rotatably mounting the threaded adjustment shaft 108 thereto.

The threaded adjustment shaft 108, which is attached at one end to an end of the light adjustment drive shaft 68, extends through and in threaded engagement with the hole 106 of nut 104. The other end of the light adjustment drive shaft 68 is attached to the adjustment hand wheel 42 which is mounted to the central tube 30 of the mounting stand 22. Rotation of the light adjustment hand wheel 42 causes the light adjustment drive shaft 68 to rotate which, in turn, causes the threaded shaft 108 to turn or rotate. Rotation of the threaded shaft moves the threaded shaft 108 axially relative to the nut 104, and causes the connecting bracket 97 to pivot about an axis parallel to, but spaced from, an axis defined by the first pinion gear shaft 100. Pivotal movement of the connecting bracket 97 causes the light source 26 to pivot independently of the camera 28.

With specific reference to FIG. 3, the camera 28 is pivotally attached to the support shaft lower section 46 by a camera support assembly 116 which includes a camera gear case 118, a camera pinion gear 120 and a pair of camera mounting brackets 122. The camera gear case 118 includes a pair of side panels 124 which are attached to opposite sides of the support shaft lower section 46, and a spacer panel 126 radially spaced from the camera pinion gear 120 and positioned between the side panels 124 (FIG. 1).

The camera pinion gear 120 is mounted for rotation upon a second pinion gear shaft 128. A portion of the camera worm gear 88 extends through a second opening 130 formed in the lower section 46 of the hollow support shaft 24 beneath the camera pinion gear 120 to allow the camera worm and pinion gears 88, 120 to meshingly engage. Opposite ends of the second pinion gear shaft 128 are supported for rotation by bearings and extend through the side panels 126 of the camera gear case 118. Electrical cables for supplying power and control signals to the camera 28 extend through the second opening 130, into and through the pinion gear case 118, and are attached to the camera 28, as shown in FIGS. 1 and 2.

Each end of the second pinion gear shaft 128 has one of the camera mounting brackets 122 attached thereto. The camera mounting brackets 122 rotate with the camera pinion gear and shaft 120, 128, and extend perpendicular to the second pinion gear shaft 128 and away from the camera gear case 118. Ends of the camera mounting brackets opposite the camera gear case are attached to a camera housing 132 which encloses the camera 28.

Rotation of the main drive shaft 56 causes the light source pinion gear 94 and camera pinion gear 120 to rotate which, in turn, rotates the first and second pinion gear shafts 100, 128 and causes the light source 26 and camera 28 to synchronously move in an arc around their respective gear shafts.

The light source 26 is preferably a high intensity light, and may be either a sealed or non-sealed type light. One such light used successfully by the inventor is sold commercially by Collins Dynamics of Aurora, Colo. under the name "CD-750".

The camera 28 is preferably mounted within the watertight enclosure or housing 132 and includes a camera unit and a lense unit. The camera unit is preferably operable in low ambient light conditions and provides high resolution. One such camera unit successfully used by the inventor is sold commercially by Ikegami Electronics, Inc. of Maywood, N.J. under the name "ICD-4220". The lense unit is preferably motorized and has a variety of zoom settings to accommodate the different distances to be encountered during use of the apparatus. One such lense unit used successfully by the inventor is sold commercially by Chugai Boyeki Corp. of Commack, N.Y. under the name "20X COMPUTAR V20Z 1528MEP".

Figure 7:
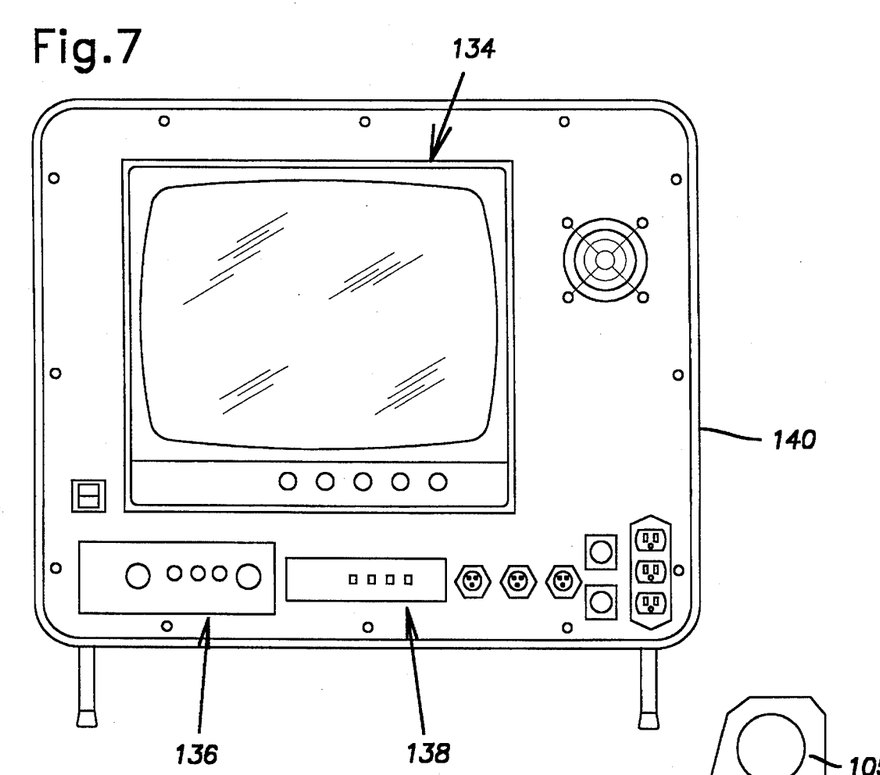
FIG. 7 is an elevational view of a video display and camera and light control enclosure according to the present invention.

The electrical cables 66 powering and controlling the operation of the light source 26, camera unit, and lense unit are connected to a display unit and associated controllers which are shown in FIG. 7. Preferably, a display unit 134, zoom lense controller 136, and an optional time and date camera titler 138 are housed within a single portable enclosure 140. The zoom lense controller 136 preferably provides a plurality of switches which change the zoom lense between zoom and telephoto, changes the focal distance (near/far), and changes the iris opening (open/close). A suitable zoom lense controller used by the inventor is sold by Pelco, Inc. of Clovis, Calif. as model "MLZ6DT". The time and date camera titler 138 allows the user to insert text and date/time information on any video tape made of the inspected ship, such as would be desirable when a defect is discovered. A video recorder (not shown) is preferably located in a separate enclosure (not shown).

In preparation for shipment or storage of the apparatus, the support shaft 24 is separated into the upper and lower sections 46, 48, the upper drive shaft 72 is uncoupled from the lower drive shaft 74, and the adjustment drive shaft 68 is uncoupled, via the connector 70, to reduce the overall length of the apparatus 20. Preferably, the electrical cables 66 are continuous, and do not require separation into different sections for shipment.

Once the apparatus 20 reaches the ship to be inspected, it is assembled by clamping the upper and lower support shaft sections 44, 46 together, as described above, connecting the upper and lower main drive shaft sections 72, 74 by sliding the transverse pin 79 of the first connector piece 77 into the notches 80 in the second connector piece 78, and connecting the light adjustment drive shaft 68 via the connector 70.

Use of the apparatus 20 of the present invention will be described hereafter with reference to the foregoing description and drawings.

With the apparatus 20 assembled, and the light source 26 and camera 28 oriented such that they are generally parallel to the support shaft 24, as shown in dashed lines in FIG. 2, the support shaft is inserted through an access opening in the ship's deck. Access openings are provided at various locations in the ship's deck to provide passage into the underlying holds, and are commonly referred to as Butterworth holes.

When the support shaft 24 is fully inserted into the hold to be inspected via the access opening, the legs 32 of the support stand 22 are supported by the deck. The deck provides a series of threaded holes around each access opening or Butterworth hole to which the support stand legs 32 are attached by conventional fasteners. Thereafter, the electrical cables are connected to the display and controllers, and power is supplied to the light source 26 and the camera 28.

The hand wheel 54 is rotated to pivot the camera and light source about their respective pinion gear shafts 100, 128 to move the camera 28 and light source 26 relatively away from the support shaft 24. The camera 28 is focused on the welds between the sheet metal and the supporting beams of the underdeck surface, the union of the side walls or transverse webs with the underdeck, or any other area of interest near the access opening.

The hand wheel 54 is rotated to pivot the camera and light source to alter their vertical orientation and thereby change the area of the hold being viewed or inspected. Pivoting is limited in an upward direction by engagement with the support shaft 24 and, in a lower direction, by engagement of the camera with the stop block 65. The support shaft 24 is rotated, via the handles 52, to rotate the camera 28 and light source 26 to allow areas on all sides of the support shaft to be viewed. Rotation of the support shaft 24 is limited by engagement of the stop members 36, 38 provided on the mounting stand 22 and the enlarged cap 50, and thus prevents the electrical cables 66 from being twisted.

When areas of the ship's hold remote from or near to the camera and light source are to be viewed, the light source 26 may not illuminate the area which the camera 28 is focused on since the light beam projecting from the light source is parallel to the camera. In such circumstances, the light adjustment hand wheel 42 is rotated to pivot the light source 26 independently of the camera 28 to allow the light provided by the light source to be directed toward the area to be viewed. The light source can preferably be moved about fifteen degrees relative to the orientation of the camera.

When all of the areas visually accessible to the apparatus have been viewed, the apparatus 20 is removed from the access opening and inserted into another access opening, and the process repeated until the entire underdeck surface and adjoining side walls and transverse webs have been inspected. As such, the present invention provides an apparatus and method for the systematic visual inspection of the underdeck, side walls, and transverse webs of a ship.

To disassemble the apparatus in preparation for shipment or storage, the apparatus is withdrawn from an access opening, the clamp members 60, 62 are unbolted, the light adjustment drive shaft connector 70 is uncoupled, and the upper support shaft is moved axially away from the lower support shaft to slide the transverse pin 79 of the first connector piece 77 out of the notches 80 in the second connector piece 78 to separate the main drive shaft 56 into the upper and lower drive shafts 72, 74.

While the preferred embodiment of the present invention is shown and described herein, it is to be understood that the same is not so limited but shall cover and include any and all modifications thereof which fall within the purview of the invention. For example, it is contemplated that the hand wheel and light adjustment hand wheel could be replaced by electric motors which would pivot the light source and camera in response to user-controlled control signals. It is also contemplated that a separate electric motor could be provided to rotate the support shaft.

What is claimed is:

1. An apparatus for inspecting an interior storage space, comprising:

an elongated hollow support shaft mounted to and extending downwardly from a mounting stand, said shaft having a longitudinal axis and being mounted for rotation about said axis;

a light source secured to said hollow support shaft and rotatable therewith;

a camera secured to said hollow support shaft and rotatable therewith;

a drive shaft extending through said hollow support shaft and being rotatable relative to said hollow support shaft, said drive shaft being operably attached to said camera and said light source, wherein rotation of said drive shaft causes said camera and light source to pivot and rotation of said hollow support shaft causes said camera and light source to rotate about said axis, thereby permitting inspection of the interior storage space.

2. An apparatus for inspecting an interior storage space as recited in claim 1, further comprising means for remotely controlling operation of said light source.

3. An apparatus for inspecting an interior storage space as recited in claim 1, further comprising means for remotely controlling operation of said camera.

4. An apparatus for inspecting an interior storage space as recited in claim 1, wherein said drive shaft has a first end attached to a hand wheel and a second end operably attached to said camera, said drive shaft being operably attached to said light source intermediate said first and second ends.

5. An apparatus for inspecting an interior storage space as recited in claim 1, wherein a light source support assembly attaches the light source to the hollow shaft and a camera support assembly attaches the camera to the hollow shaft.

6. An apparatus for inspecting an interior storage space, as recited in claim 5, wherein the light source support assembly includes a pinion gear which meshingly engages a worm gear attached to said drive shaft, said light source being mounted to said pinion gear and rotating therewith to allow said light source to pivot in response to rotation of said drive shaft.

7. An apparatus for inspecting an interior storage space, as recited in claim 6, further comprising a light source adjustment shaft and means coupled to said adjustment shaft for moving said light source independently of said camera.

8. An apparatus for inspecting an interior storage space, as recited in claim 7, wherein said light source support assembly includes a mounting bracket which rotates with the pinion gear to pivot the light source.

9. An apparatus for inspecting an interior storage space as recited in claim 8, wherein said means for moving said light source independently of said camera include a connecting bracket which is pivotally mounted on said mounting bracket, wherein rotation of said adjustment drive shaft causes said connecting bracket to pivot and thereby pivots said light source independently of said camera.

10. An apparatus for inspecting an interior storage space, as recited in claim 5, wherein the camera support assembly includes a pinion gear which meshingly engages a worm gear attached to said drive shaft, said camera being mounted to said pinion gear and rotating therewith to allow said camera to pivot in response to rotation of said drive shaft.

11. An apparatus for inspecting an interior storage space, as recited in claim 10, wherein said camera support assembly includes a mounting bracket which extends between a pinion gear shaft and the camera, said mounting bracket being fixedly mounted to said pinion gear shaft and rotating therewith to cause said camera to pivot about said pinion gear shaft.

12. An apparatus for inspecting an interior storage space provided by a ship, said ship having a deck surface overlying said interior storage space, said deck surface having formed therein a plurality of access openings which provide passage into said interior storage space, comprising a mounting stand secured to the deck surface over one of the access openings;

an elongated hollow support shaft mounted to and extending downwardly from said stand, said shaft having a longitudinal axis and being mounted for rotation about said axis;

a light source secured to said hollow support shaft and rotatable therewith;

a camera secured to said hollow support shaft and rotatable therewith;

means for remotely controlling operation of said light source;

means for remotely controlling operation of said camera;

a drive shaft extending through said hollow support shaft and being rotatable relative to said hollow support shaft, said drive shaft being operably attached to said camera and said light source, wherein rotation of said drive shaft causes said camera and light source to simultaneously pivot and allow inspection of said interior storage space; and, means for pivoting said light source independently of said camera.

13. An apparatus for inspecting an interior storage space, as recited in claim 12, wherein said drive shaft has a first end attached to a hand wheel and a second end operably attached to said camera, said drive shaft being operably attached to said light source intermediate said first and second ends.

14. An apparatus for inspecting an interior storage space, as recited in claim 13, wherein a light source support assembly attaches the light source to the hollow shaft and a camera support assembly attaches the camera to the hollow shaft.

15. An apparatus for inspecting an interior storage space, as recited in claim 14, wherein said light source support assembly includes a mounting bracket and a light source pinion gear, said light source pinion gear meshingly engaging a light source worm gear provided by said drive shaft and said mounting bracket being secured, at one end, to a light source pinion gear shaft and, at another end, to said light source, whereby rotation of said drive shaft causes said light source to pivot about said pinion gear shaft.

16. An apparatus for inspecting an interior storage space, as recited in claim 14, wherein said camera support assembly includes a mounting bracket and a camera pinion gear, said camera pinion gear meshingly engaging a camera worm gear provided by said drive shaft and said mounting bracket being secured, at one end, to a camera pinion gear shaft and, at another end, to said camera, whereby rotation of said drive shaft causes said camera to pivot about said pinion gear shaft.

17. An apparatus for inspecting an interior storage space as recited in claim 15, wherein said means for pivoting said light source independently of said camera include a light adjustment drive shaft and a connecting bracket, said connecting bracket being pivotally mounted to said mounting bracket at one end and attached to said light source at an opposite end, wherein rotation of said light adjustment drive shaft causes said connecting bracket and said light source to pivot about said axis.

18. A method for inspecting an interior storage space provided by a ship, said ship having a deck surface overlying said interior storage space, said deck surface having formed therein a plurality of access openings which provide passage into said interior storage space, comprising the steps of:

inserting a hollow support shaft into and through one of said access openings, said hollow support shaft having a longitudinal axis and first and second ends, said first end being mounted to a mounting stand for rotation about said longitudinal axis and said second end having secured thereto a camera and a light source, said camera and light source rotate with said hollow support shaft about said longitudinal axis and are pivotable relative to said hollow support shaft;

attaching said mounting stand to said deck surface adjacent said one access opening;

simultaneously pivoting said camera and light source relative to said hollow support shaft into an operating position;

operating said camera and light source to illuminate a first portion of a surface surrounding said interior storage space and to allow an operator to remotely visualize and inspect said surface; and, rotating said hollow support shaft, camera, and light source about said longitudinal axis, thereby allowing illumination and remote visualization of a second portion of said surface, said second portion being spaced from said first portion.

19. A method for inspecting an interior storage space provided by a ship as recited in claim 18, further comprising the step of pivoting said light source independently of said camera.

\* \* \* \* \*